(12) United States Patent
Ahmed et al.

(10) Patent No.: US 11,216,517 B1
(45) Date of Patent: Jan. 4, 2022

(54) METHODS AND SYSTEMS FOR SELECTING USER GENERATED CONTENT

(71) Applicant: Snap Inc., Santa Monica, CA (US)

(72) Inventors: Samir Ahmed, Marina del Rey, CA (US); Andrew Lin, Long Island City, NY (US); Alexander R. Osborne, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 144 days.

(21) Appl. No.: 16/050,969

(22) Filed: Jul. 31, 2018

Related U.S. Application Data

(60) Provisional application No. 62/539,316, filed on Jul. 31, 2017.

(51) Int. Cl.
*G06F 16/583* (2019.01)
*G06F 16/9535* (2019.01)
(Continued)

(52) U.S. Cl.
CPC ........ *G06F 16/9535* (2019.01); *G06F 3/0482* (2013.01); *G06F 16/51* (2019.01);
(Continued)

(58) Field of Classification Search
CPC .... G06F 16/9535; G06F 3/0482; G06F 16/51; G06F 16/20; G06F 16/30; G06F 40/00; G06N 3/08; G06Q 50/01
See application file for complete search history.

(56) References Cited

U.S. PATENT DOCUMENTS

| 5,754,939 A | 5/1998 | Herz et al. |
|---|---|---|
| 6,038,295 A | 3/2000 | Mattes |

(Continued)

FOREIGN PATENT DOCUMENTS

| CA | 2887596 A1 | 7/2015 |
|---|---|---|
| WO | WO-2012000107 A1 | 1/2012 |

(Continued)

OTHER PUBLICATIONS

Castelluccia, Claude, et al., "EphPub: Toward robust Ephemeral Publishing", 19th IEEE International Conference on Network Protocols (ICNP), (Oct. 17, 2011), 18 pgs.

(Continued)

*Primary Examiner* — Sanchita Roy
(74) *Attorney, Agent, or Firm* — Schwegman Lundberg & Woessner, P.A.

(57) ABSTRACT

Disclosed are systems, methods, and computer-readable storage media to select user generated content of a social network. Each of the images may had one or more filters applied to it. In some aspects, these filters may be sponsored by a third party, different than an operator of the social network. Automatic content screening methods may be applied to eliminate submitted images which have blatantly offensive or otherwise inappropriate content. Additional human screening of the images may be performed. Remaining images may be provided in a highlight reel. The highlight reel may showcase the third party's product or service and users of the product or service. The highlight reel may be utilized to demonstrate how the filters may be utilized by real users.

19 Claims, 15 Drawing Sheets

(51) Int. Cl.
  *G06F 3/0482* (2013.01)
  *G06N 3/08* (2006.01)
  *G06F 16/51* (2019.01)
  *G06Q 50/00* (2012.01)

(52) U.S. Cl.
  CPC ............. *G06F 16/583* (2019.01); *G06N 3/08* (2013.01); *G06Q 50/01* (2013.01)

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,776 B2 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1* | 8/2015 | Spiegel ................. H04H 20/61 |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgensen et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2068/0120409 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0066743 A1* | 3/2011 | Hurley ................. H04W 4/021 709/231 |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0258560 A1* | 10/2011 | Mercuri ................. G06F 16/958 715/753 |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede et al. |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0138735 A1* | 5/2013 | Kanter ................. G06Q 10/101 709/204 |
| 2013/0191455 A1* | 7/2013 | Penumaka ............... H04L 67/22 709/204 |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0143247 A1* | 5/2014 | Rathnavelu ........ G06K 9/00288 707/737 |
| 2014/0201527 A1 | 7/2014 | Krivorot |
| 2014/0279061 A1* | 9/2014 | Elimeliah ............... G06Q 50/01 705/14.72 |

(56) References Cited

U.S. PATENT DOCUMENTS

| | | | |
|---|---|---|---|
| 2014/0282096 A1* | 9/2014 | Rubinstein | G06F 3/04842 |
| | | | 715/753 |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2015/0199082 A1 | 7/2015 | Scholler et al. | |
| 2015/0227602 A1 | 8/2015 | Ramu et al. | |
| 2015/0334168 A1* | 11/2015 | Kosslyn | H04L 67/10 |
| | | | 709/204 |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0180887 A1 | 6/2016 | Sehn | |
| 2016/0267126 A1* | 9/2016 | Olson | G06F 16/9536 |
| 2016/0277419 A1 | 9/2016 | Allen et al. | |
| 2016/0321708 A1 | 11/2016 | Sehn | |
| 2016/0359957 A1 | 12/2016 | Laliberte | |
| 2016/0359987 A1 | 12/2016 | Laliberte | |
| 2017/0070358 A1* | 3/2017 | Svendsen | H04L 67/18 |
| 2017/0161382 A1 | 6/2017 | Ouimet et al. | |
| 2017/0263029 A1 | 9/2017 | Yan et al. | |
| 2017/0269819 A1* | 9/2017 | Pinpin | G06F 16/958 |
| 2017/0287006 A1 | 10/2017 | Azmoodeh et al. | |
| 2017/0295250 A1 | 10/2017 | Samaranayake et al. | |
| 2017/0323312 A1* | 11/2017 | Penumaka | G06Q 30/0201 |
| 2017/0351417 A1* | 12/2017 | Manico | G06F 16/50 |
| 2017/0374003 A1 | 12/2017 | Allen et al. | |
| 2017/0374508 A1 | 12/2017 | Davis et al. | |
| 2018/0089593 A1* | 3/2018 | Patel | G06N 5/003 |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2016054562 A1 | 4/2016 |
| WO | WO-2016065131 A1 | 4/2016 |
| WO | WO-2016/112299 A1 | 7/2016 |
| WO | WO-2015192026 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_jn_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-yoii-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.eom/print/c/a/MessagingandCollaboration/StealthTextShouldYouChoosetoAcceptit», (Dec. 13, 2005), 2 pgs.

* cited by examiner

METHODS AND SYSTEMS FOR SELECTING USER GENERATED CONTENT

CROSS REFERENCE TO RELATED APPLICATIONS

The application claims priority to U.S. Provisional Application No. 62/539,316, filed Jul. 31, 2017, and entitled "METHODS AND SYSTEMS FOR SELECTING USER GENERATED CONTENT." The contents of this prior application is considered part of this application, and is hereby incorporated by reference in its entirety.

TECHNICAL FIELD

The present disclosure generally relates to the technical field of managing network created content. Specifically, the disclosed methods and systems provide for sharing of selective content with a plurality of users of a social network.

BACKGROUND

Social networking has enabled millions of users to create their own electronic content. As content creation has become more decentralized, the quality of this content has become more varied. Individual users may have vastly different standards as to what may comprise acceptable content for sharing online. Some user generated content may reflect positively on products or services associated with the content. other content may reflect less positively. Thus, improved systems and methods for managing user generated content are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
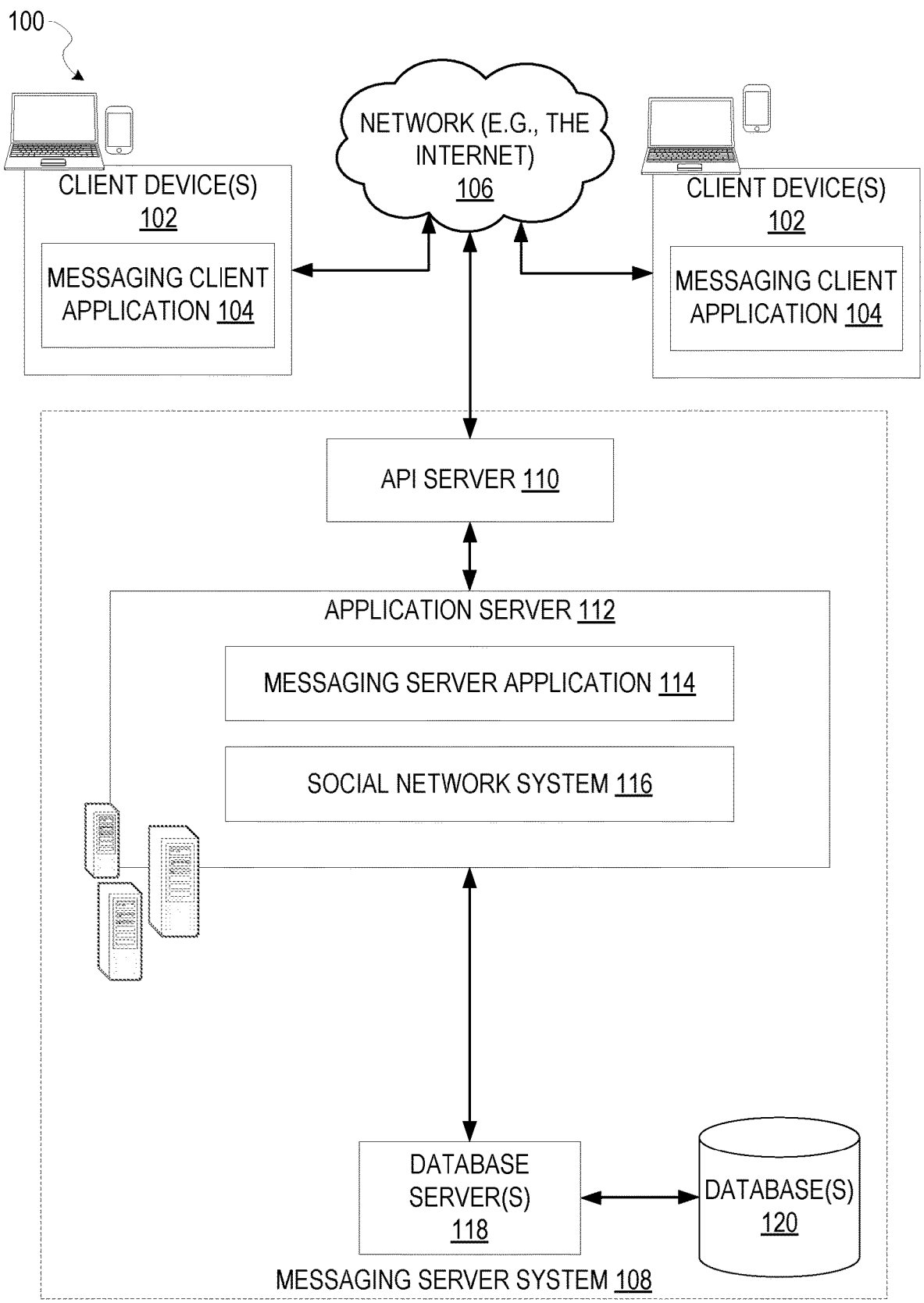
FIG. 1 is an exemplary block diagram of a messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products that provide for the management of user generated content. Some social networks may provide features to users that enable the users to apply one or more effects to user generated content, such as user generated images. Various types of image effects may be packaged into separate and discrete image "filters." Applying a filter to an image invokes particular processing on the image, changing one or more characteristics of the image. In some cases, applying a filter may add particular content to the image. For example, one image filter may overlay a user generated image with a rainbow. Another filter may accentuate particular portions of a user's face, such as the eyes or teeth. Another filter may add a banner or logo, or other messaging to a user generated image.

A social network operator may provide some filters to users. Other filters may be sponsored by a third party, different than the social network operator. For example, one or more third parties may agree with the social network operator to include filters developed by or at the direction of the third parties to users of the social network. In some cases, these third party filters may only be available to users when the user is within a particular geographic location. For example, event specific filters may be provided to users in some aspects. For example, attendance at an organized event, such as a football game, tractor pull, or musical concert, may enable a set of filters that are otherwise not available.

Third party sponsored filters may modify user generated content so as to enhance the user generated content. For example, in some aspects, a user generated image may be enhanced with a brand oriented message. A third party manufacturer may provide a filter that enhances a user generated image to include a logo in the image. In another example, a third party soft drink manufacturer may provide a filter that adds a bottle bearing a logo for the soft drink to an applied image. Users may choose to apply these filters to their own images in a variety of circumstances. Some of the resulting user generated images may reflect positively on the third party. Other resulting images may include content that is less consistent with a brand image desired by the third party.

When consistent with a brand image, these user generated content based images can be valuable to the third party. For example, when viewed by other users or potential users of a third party product or service, user generated images may reinforce the brand's image to these other users. Because the images are user generated, they may be perceived as more credible than images created solely by the third party. Furthermore, users of a third party product may exhibit similar or desirable characteristics for other users of, or potential users of, the third party product or service. In some aspects, the user generated content may demonstrate values or behavior that resonates with other users or potential users of the third-party product or service.

In some aspects, the disclosed methods and systems provide a manner in which this latent value of user generated content to the third party may be realized. After the user generated content is created, a user may choose to submit their user generated content for consideration by the third party for use in reinforcing the brand's image. In some aspects, benefits may accrue to the user by submitting their content. For example, in various aspects, the user may be entered into a sweepstakes, or accumulate points in a brand loyalty program by submitting their content for consideration. After the user generated content is submitted, the third party may then review the submitted user generated content, and select those images that it finds to be helpful in furthering its business purposes.

These images may then be utilized by the third party in a variety of ways. For example, in some aspects, the selected images may then be highlighted to users and/or internal third party stakeholders. By providing a mechanism to screen user generated content for its consistency with third party goals, latent value of the user generated content may be realized, for the benefit of both the user and the third party.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
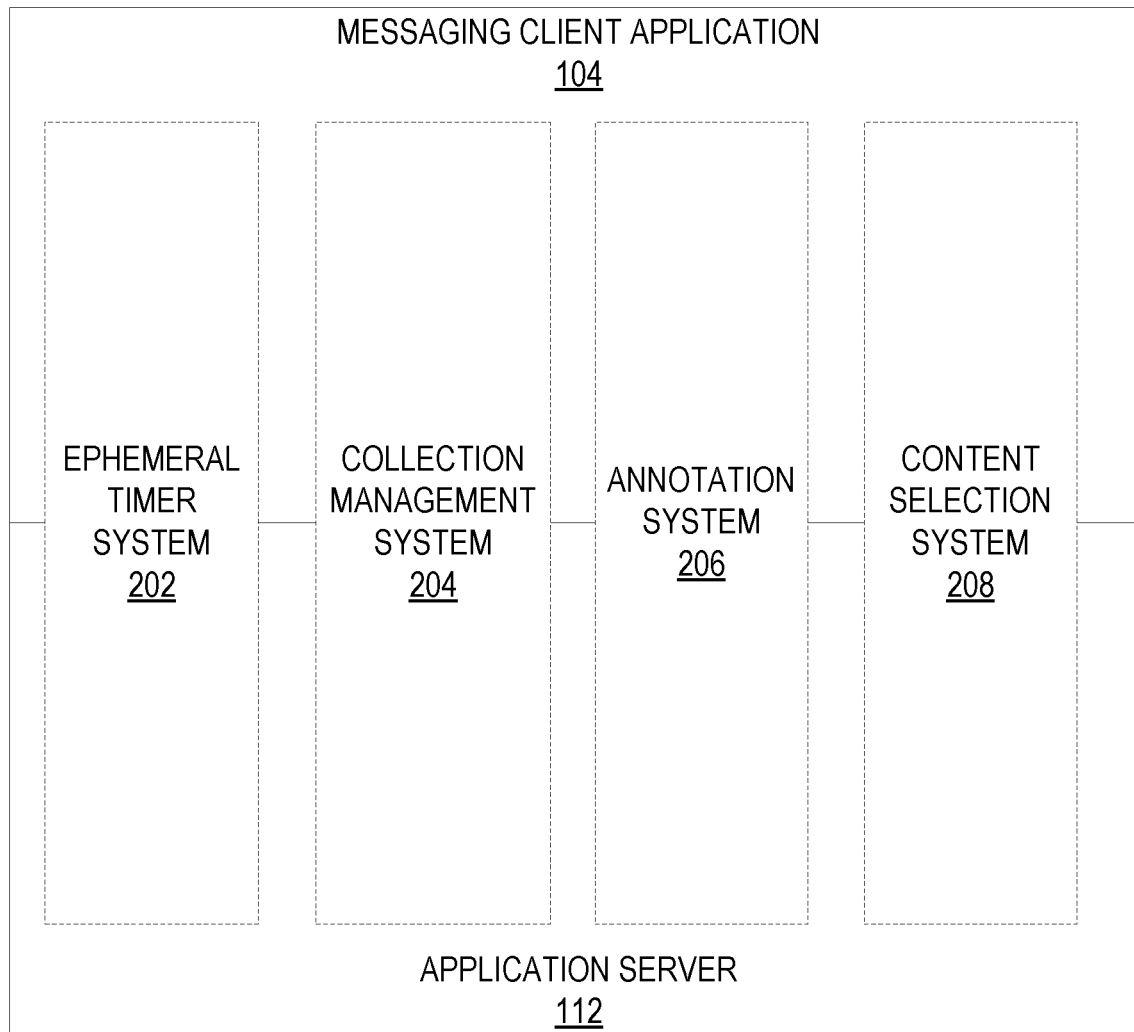
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and a content selection system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The content selection system 208 may provide for the selection of user generated content for other uses. For example, the content selection system 208 may provide for one or more filters to be applied to user generated content, such as images. The filtered images may be submitted, but a user, to a location that signals that the images are provided for additional consideration. For example, by submitting the images to a "our story" component, discussed below, a user may signal their willingness to have their images distributed to other users. Images submitted by users may be reviewed to determine whether those images are appropriate. If the images are appropriate, they may be distributed to other users. The content selection system 208 is discussed in more detail below.

Figure 3:
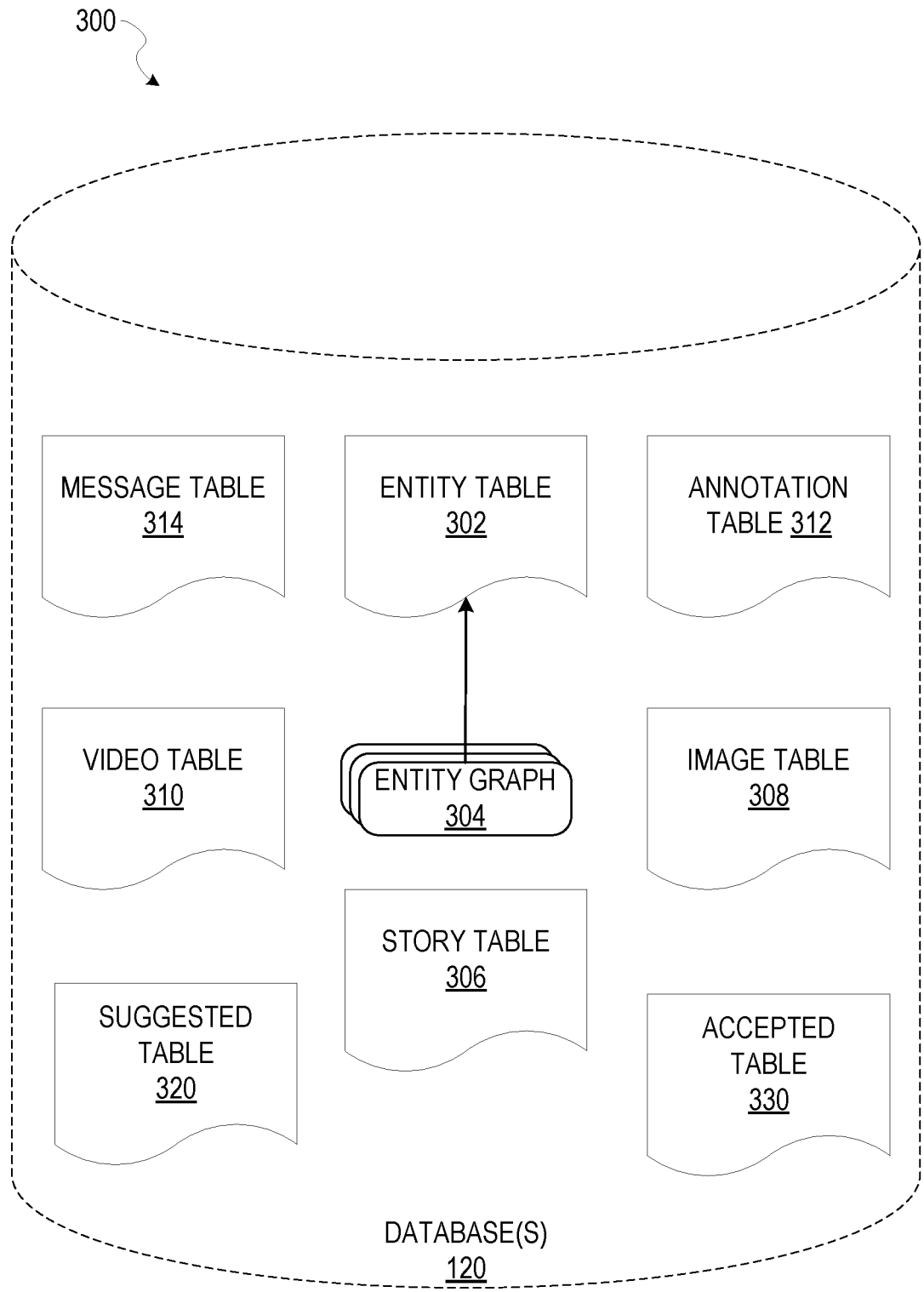
FIG. 3 is an exemplary data base schema utilized by the messaging system of FIG. 1.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 614. An entity table 602 stores entity data, including an entity graph 304. Entities for which records are maintained within the entity table 602 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 may also include a suggested table and an accepted table 330 in some aspects. The suggested table 320 may identify user generated content that has been identified by various aspects disclosed as potentially useful for display in a highlight reel. In some aspects, user generated content may be initially inserted into the suggested table 320 by a classifier, which may analyze user generated content for content that may be of relatively higher value in the highlight reel.

The database 120 may also include in some aspects, an accepted table 330. The accepted table 330 may identify user generated content that a user has agreed to provide in a highlight reel. For example, a user may be asked for their consent to share content included in the suggested content. If the user agrees, the content may move from the suggested table 320 to the accepted table 330. If the user declines, the content may be deleted from the suggested table, or at least not identified by the suggested table 320. Even if the content is deleted from the suggested table 320, that content may still be present in another table, such as the image table 308 or video table 310.

Figure 4:
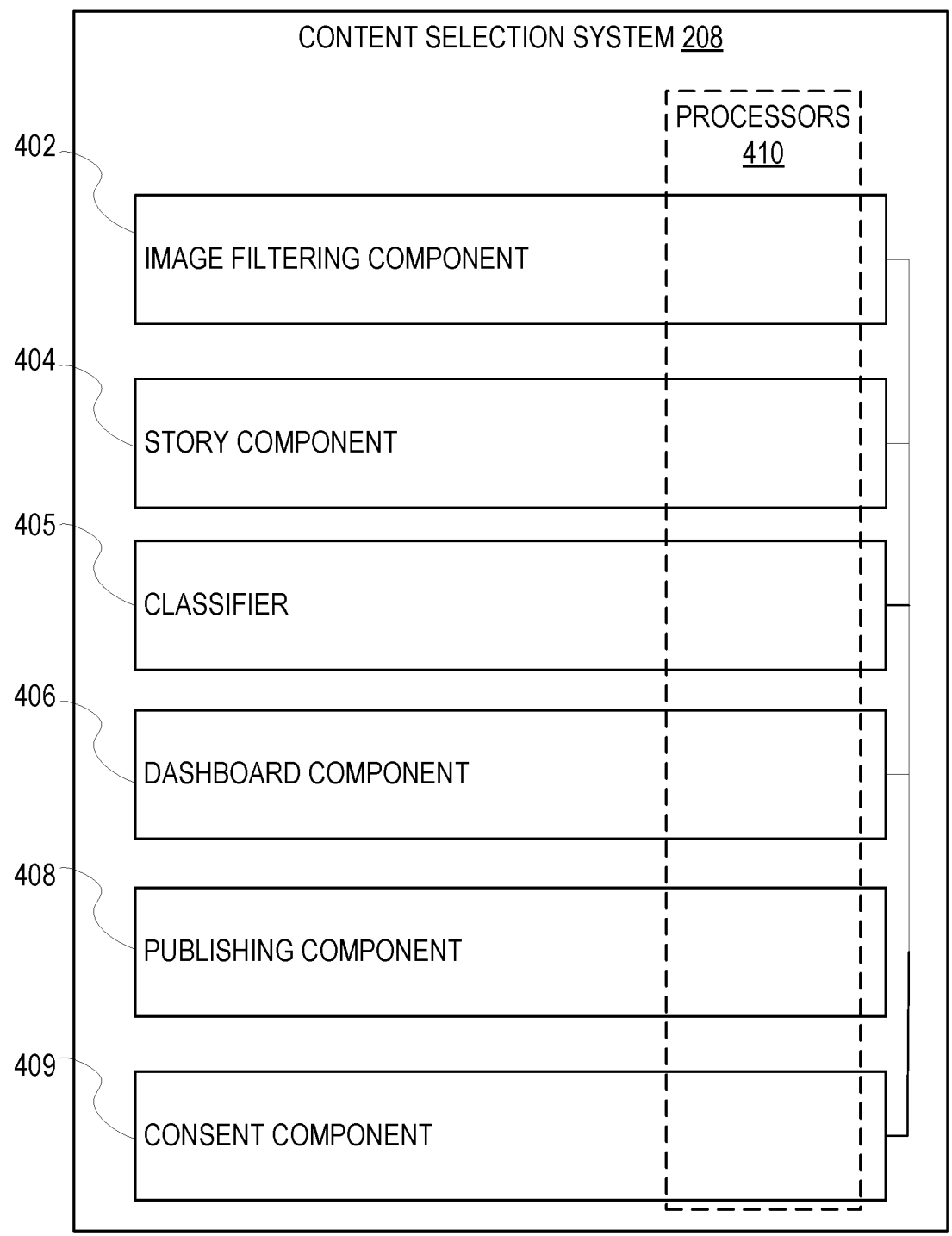
FIG. 4 is an exemplary block diagram illustrating functional components of a content selection system that forms part of the messaging system, according to some example embodiments.

FIG. 4 is a block diagram illustrating functional components of the content selection system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the content selection system 208 to facilitate additional functionality that is not specifically described herein. As shown, the content selection system 208 includes an image filtering component 402, a story component 404, a classifier 405, a dashboard component 406, and a publishing component 408.

The above referenced functional components of the content selection system 208 are configured to communicate with each other (e.g., via a bus, shared memory, a switch, or APIs). Collectively, these components facilitate generation of user generated content, and submission of the user generated content to the story component 404. Content submitted to the story component may, in some aspects, be provided with greater visibility. For example, a set of users may have access to the story component 404 that is a different set of users than a second set of users that would otherwise have access to the user generated content. In return for submitting their content to the story component 404, the user may be provided with one or more incentives. For example, in some aspects, the user may be provided with points in a brand loyalty program in return for their submission of user generated content. Other incentives are also contemplated. Once the user generated content has been submitted to the story component 404, it may be reviewed to determine whether it meets one or more criteria. If the user generated content meets the criteria, it may be further published. For example, in some aspects, the user generated content may be distributed to a set of users if it meets the criteria. The new set of users may be generally unassociated with the user that submitted the content originally.

The image filtering component 402 is responsible for applying one or more filters to a user generated image. The filters may perform one or more image processing techniques on the user generated image. For example, in some aspects, a filter may change the coloration of the user generated image, or exaggerate certain facial features present in the image (e.g. eyes, teeth). After the effects are applied, the image filtering component generates a filtered user generated image. Each filter applied to the user generated image may be associated with a particular entity. In some aspects, the entity may have sponsored the filter. In some aspects, when a filter is applied to a user generated image, an association between the image and the filter is preserved. For example, in some aspects, meta data within the image may record that the filter has been applied to the image. Alternatively, this information may be stored in a data structure separate from the image. In some aspects, a separate table may be maintained that associates the filter with the entity. Thus, via the image meta data and the separate table, an association between the image and the entity may be made.

The story component 404 provides a collection of filtered user generated images. The story component 404 may provide messaging to a user submitting content, indicating that the user gives up certain copyrights associated with the user generated content by submitting the content to the story component.

The classifier component 405 may be trained to classify user generated content into at least two groups. A first group may be content that is not appropriate for inclusion in a highlight reel. A second group of content may be content that could be appropriate for inclusion in a highlight reel. The classifier may be trained based on a training set of content. Each content in the training set of content may be annotated as to belonging to either the first or second group of content. By training the classifier using the training set of content, the classifier may then be able to predict which additional content may fall into the first or second group. In some aspects, a third group of content may be identified by the classifier 405. This third group of content may include content that could be appropriate for sharing in a highlight reel, but that consent is unlikely to be provided by a user generating the content. To support classification of content into this group, the annotation of the training set of content may also include an indication, for content appropriate for inclusion in the highlight reel, but that consent for such inclusion was not provided by a user generating the content.

The dashboard component 406 provides a user interface for filtered user generated content submitted to the story component 404. In some aspects, the dashboard component may provide selective views of the submitted content. The views may be based on attributes of a user that is logged in to the dashboard component. For example, a user of the dashboard component 406 may be associated with a particular entity. At least a portion of the filtered user generated images may also be associated with the particular entity, as described above. Thus, in some aspects, the dashboard component may display a view to a user that displays the portion of filtered user generated images, as both the user and the images are associated with the entity. From the user interface, the user may be able to select one or more of the images. In some aspects, the user may select one or more of the images for further publication. In some aspects, the user select one or more of the images to restrict further publication.

The publishing component 408 may further publish content based on selection information from the dashboard component 406. In some aspects, content selected for further publication by the dashboard component 406 may be included in a "highlight reel" as described below, for example, with respect to FIG. 10. In some aspects, content selected for further publication by the dashboard component 406 may be published in other ways. For example, in some aspects, selected filtered user generated content may be displayed to a set of one or more different users, with these users being a different set of users that are associated with the user submitted the filtered user generated content.

The consent component 409 may attempt to obtain consent from a user for inclusion of content they generated to a highlight reel. For example, the consent component 409 may be configured to communicate with a user of the social network system 116 via message, or by displaying a dialog on the user's client device. The message or dialog may identify the particular user generated content for which consent is sought, and request input from the user indicating whether consent is given or not.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the content selection system 208 may physically include an arrangement of one or more processors 410 (e.g., a subset of or among one or more processors of a machine) configured to perform the operations described herein for that component. As another example, any component of the content selection system 208 may include software, hardware, or both, that configure an arrangement of the one or more processors 410 to perform the operations described herein for that component. Accordingly, different components of the content selection system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 5-9.

Figure 5:
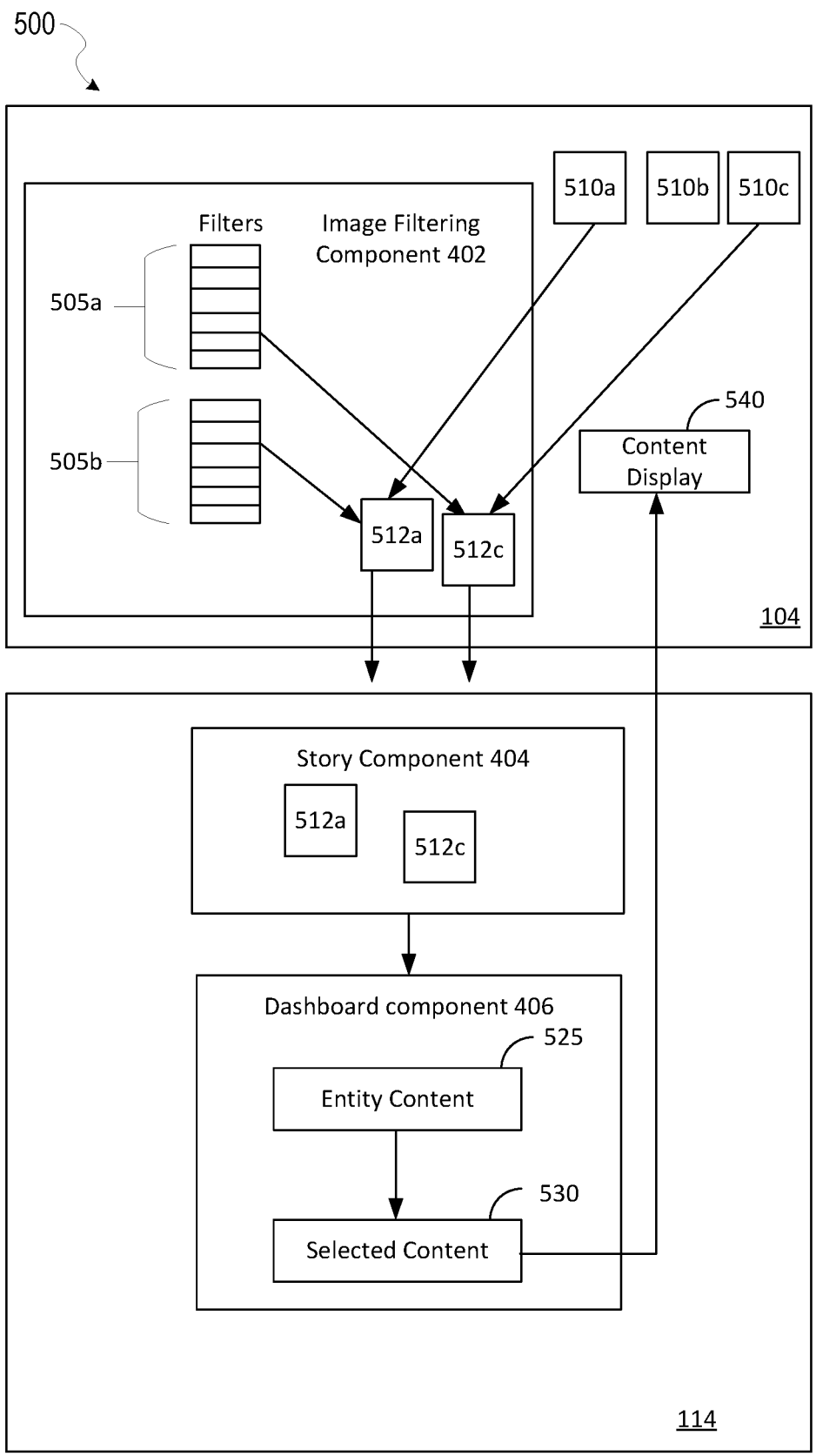
FIG. 5 is an exemplary data flow diagram illustrating data flows between the functional components of FIG. 4.

FIG. 5 is an exemplary data flow diagram of one method implemented by the disclosed embodiments. FIG. 5 illustrates the messaging client application 104 and the messaging server application 114.

The messaging client application 104 is shown generating three user instances of user generated content 510a-c. In some aspects, one or more of the user generated content 510a-c may be generated as ephemeral messages or ephemeral content. In other words, one or more of the user generated content 510a-c may have a limited life, after which, the one or more ephemeral messages may be deleted by the social network system 116. The messaging client application 104 may then, via the image filtering component 402, selectively apply one or more filters 505a-b to the user generated content 510a-c. As shown in FIG. 5, applying a filter from filters 505a to the user generated content 510c to produce filtered content 512c. Applying a filter from filters 505b to user generated content 510a results in filtered content 512a. If a filtered content 512a is generated from user generated content 510a, the filtered content 512a may inherit any ephemeral properties of user generated content 510a.

The filters may be sponsored by or otherwise be associated with one or more $3^{rd}$ party entities. For example, filters 505a may be owned by a first $3^{rd}$ party entity, such as a first corporation, while filters 505b may be owned by a second $3^{rd}$ party entity, such as a second corporation. The filters may be selectively applied to the user generated content 510a-c based on input from a user logged into the messaging client application 104. While FIG. 5 shows a single messaging client application 104, the disclosed methods and systems contemplate that a plurality of users may be logged into a corresponding plurality of messaging client applications 104. Each of these users may each generate one or more instances of user generated content 510a-c. Additionally one or more of these plurality of users may similarly selectively apply one or more filters 505a-b to their respective user generated content 510a-c.

The messaging client application 104 may be further configured to selectively transmit the filtered content 512a and 512c to the messaging server application 114. The transmission of the filtered content 512a and/or 512c may be in response to particular input from a user interface of the messaging client application 104. For example, a user of the messaging client application 104 may select which of the filtered content 512a and/or 512c are to be sent to the messaging server application 114 and the story component 404. In some aspects, if a user selects to sent a particular filtered content to the messaging server application 114 and the story component 404, the messaging server application 114 may copy the content, but eliminate any ephemeral properties associated with the message (e.g. a scheduled deletion time or limited life time of the content). In some aspects, a warning dialog may be displayed to the user, notifying the user that in order to include the content in the story 404, the ephemeral properties must be cleared. Upon acceptance of this condition after receiving the warning, the ephemeral properties may be cleared and the content moved to the story component 404.

In some aspects, the messaging server application 114 may include at least a story component 404, the dashboard component 406, and the publishing component 408.

A user of the messaging client application 104 may provide input that causes the messaging client application 104 to transmit the filtered content 512a and 512c to the messaging server application 104, and to indicate the filtered content 512a and/or 512c is to be submitted to the story component 404 of the messaging server application 114. The story component 404 may form a physical or virtual collection of filtered content provided by one or more users via one or more respective instances of the messaging client application 104.

The dashboard component 406 may be configured to read the content accumulated by the story component 404. In some aspects, the dashboard component 406 may select portions of the content accumulated by the story component 404. For example, the dashboard component 406 may be configured to select content from the story component 404 based on which filters of the filters 505a-b were applied to the content by the messaging client application(s) 104. The selection may be based, in some aspects, on access rights or capabilities associated with a user session of the dashboard component 406. For example, in some aspects, a user logged into the dashboard component 406 may be associated with an entity, such as the first corporation or second corporation discussed above. The user may authenticate with the dashboard component 406, establishing an association between the user and the entity, for example, via a user profile defining the association and associated with the user session. The filtering by the dashboard component 406 may generate entity content 525, which may be a subset of the filtered content (e.g. 512a and 512c) stored in the story component 404. In some aspects, the dashboard component 406 may filter images collected by the story component 404 to those associated with one or more particular entities associated with a user session.

The dashboard component 406 may then select zero or more images included in the entity content 525 to form the selected content 530. The selection may be based, in some aspects, on whether an image meets one or more criteria. For example, in some aspects, automated image recognition methods, such as those employing convolutional neural networks, may be utilized to screen out one or more images in the entity content 525 that have inappropriate content. In some aspects, the user logged into the dashboard component 406 may not be provided with access to these screened out images. Instead, the user may manually review one or more of the entity content 525 images and determine whether they should be selected for further publication or not. The user may then indicate the results of the determination via a user interface provided by the dashboard component 406. The selected images form selected content 530.

The selected content 530 may then be further published. For example, the selected content may be utilized as images in a highlight reel, as illustrated below in FIG. 10. In some aspects, the selected content may be distributed to one or more users of the messaging system 100. This set of users may be a larger set of users than are typically associated with a user submitting the content to the story component 404. For example, while the submitting user may have less than one hundred (100) users with which they typically share content, the further publishing of the content by the publishing component 408 may distribute that content to thousands of users or potentially hundreds of thousands of users.

The messaging server application 114 may be configured to transmit the one or more items in the filtered content 530 to a content display window of the messaging client application(s) 114. In some aspects, a first user may submit filtered content 512a and/or 512c to the story component 404 via their respective messaging client application 104. One or more of the images 512a and/or 512c may then be included in the filtered content 530 and distributed to a content display window 540 within a different user's messaging client application 104. In some aspects, one or more of the user generated content 512a and/or 512c may be distributed to the content display window 540 of a plurality of different user's messaging client applications 104.

Figure 6:
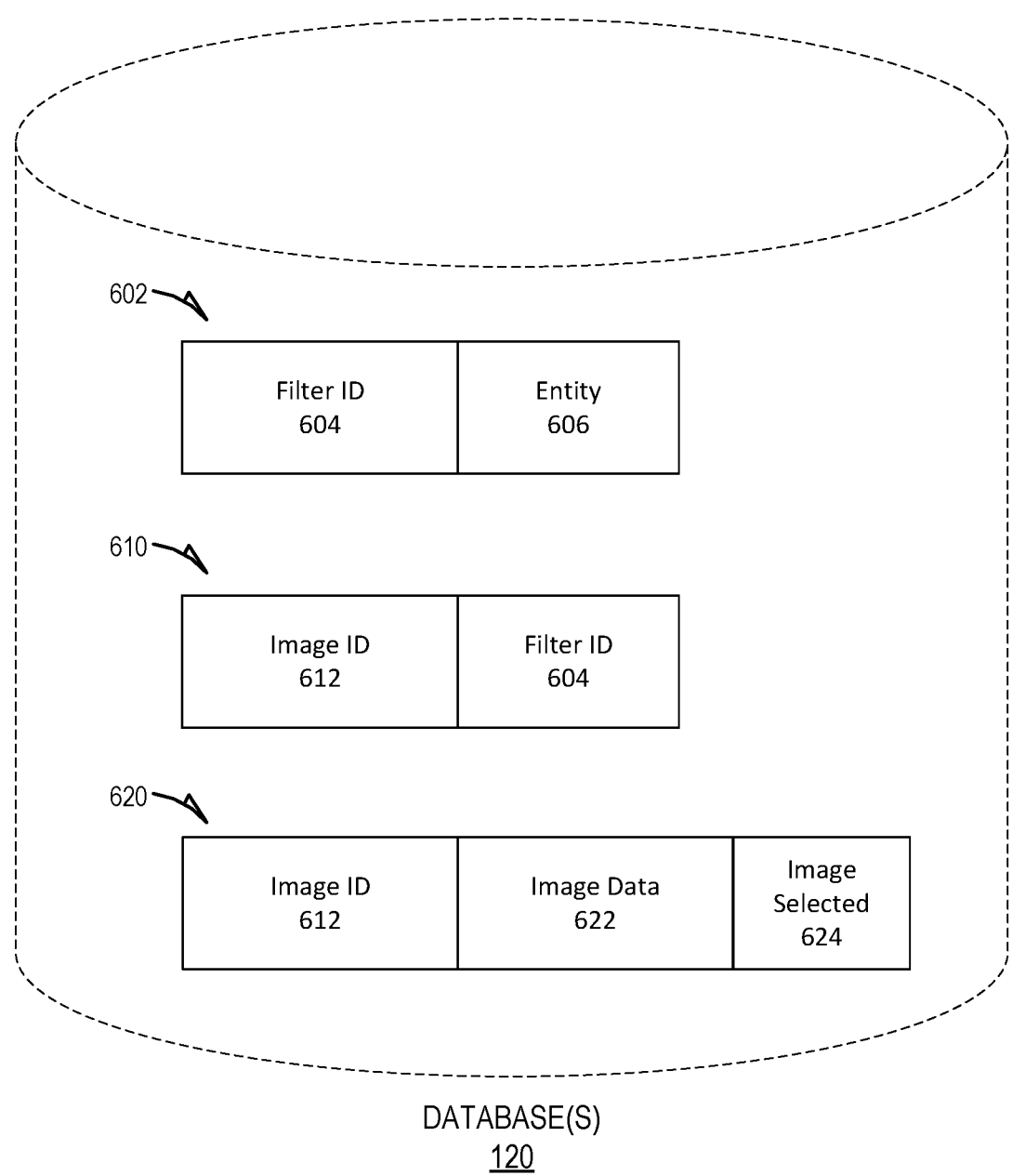
FIG. 6 is an exemplary data base schema utilized by the messaging system of FIG. 1.

FIG. 6 shows a portion of an exemplary database schema that may be implemented in the database 120, discussed above with respect to FIGS. 1 and 3. The exemplary database schema 600 includes a filter table 602, applied filter table 610, and an image table 620. The filter table 602 maintains a relationship between a filter identified that may be applied to images (identified via a filter identifier 604 column) and an entity associated with the filter (identified by an entity identifier column 606). The entity 606 may have sponsored or otherwise provided support for the filter identified by the filter id 604.

The applied filter table 610 includes an image identifier column 612 and a filter id column 604. The image identifier column 612 identifies an image in the image table 620. The filter identifier column 604 identifies a filter that was applied to the image identified in the image id column 612.

The image table 620 includes an image identifier column 612, image data 622, and an image selected column 624. The image identifier column 612 stores an identifier for an image. The image data column 622 stores image data defining the image identified in the image identifier column 612. The image selected column 624 indicates whether the image identified by the image id 620 has been selected or not. The selection may be based on input received from a user interface, as discussed further below. In some aspects, the dashboard component 406 may control whether the image is selected in column 624. The selection may determine whether the image identified by the image identifier 612 is consistent with a message of the entity 606. In some aspects, the applied filter table 610 and/or image table 620 may be included in the image table 308, discussed above with respect to FIG. 3.

Figure 7:
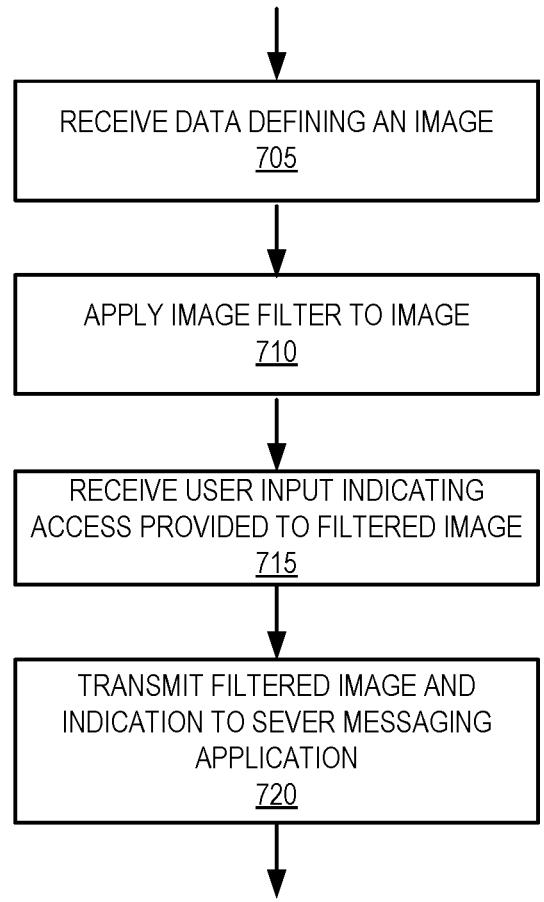
FIGS. 7-9 are flow charts of exemplary methods for selecting content in the messaging system of FIG. 1.

FIG. 7 is a flowchart of an exemplary method for indicating distribution rights for user generated content. In some aspects, the process 700 discussed below with respect to FIG. 7 may be integrated into the messaging client application 104, discussed above with respect to FIGS. 1 and 2. For example, in some aspects, instructions included in the messaging client application 104 may configure a hardware processor in a client device 102 to perform one or more of the functions discussed below with respect to FIG. 7.

Process 700 discussed below provides a mechanism for creators of user generated content to indicate to an operator of a social network that they are granting to the operator certain access rights to the user generated content. For example, upon creation of the user generated content on the client devices, the user generated content may have a first set of intellectual property rights, such as copywrite privileges. For example, when the user generated content is created, the user may have exclusive copyright rights to the user generated content. These rights may restrict or prevent the distribution or access of the user generated content by others. For example, distribution of the user generated content by others, especially for commercial reasons, may be prohibited by the initial copyright.

The social network operator may provide a notice to the user that submission of the user generated content to a particular location on the social network, for example, the story component 404, described above with respect to FIGS. 4 and 5, may include an acknowledgment that the operator of the social network is granted with the, unlimited in some aspects, distribution rights for the user generated content. In exchange for providing distribution rights to the operator of the social network for the user generated content, the user may, in some aspects, be provided with benefits. In some aspects, cash payment may be provided. Alternatively, points in a brand loyalty program may be provided. In still some other embodiments, credits for utilizing one or more services provided by the social network may be granted to the user. In some aspects, the user may be entered into one or more sweepstakes. In some aspects, no benefits may be provided.

In block 705, data is received defining an image. In some aspects, the data may be received from an imaging sensor. For example, in some aspects, the client device 102 of FIG. 1 may include an integrated imaging sensor. A user of the messaging client application 104, via one or more inputs, may direct the client device 102 to capture an image using the integrated imaging sensor. The messaging client application 104 may then receive data defining the captured image from the imaging sensor. In some aspects, an example of the received image may be any one of the images 510a-c described above with respect to FIG. 2.

In block 710, an image filter is applied to the image received in block 705. For example, as described above with respect to FIG. 5, one or more image filters 505a-505b may be applied to any one of the images 510a-c. The image filter may modify or enhance the image received in block 705. For example, the filter may superimpose a logo onto the user generated content in some aspects. In some aspects, the filter may modify the coloration of the image. In some aspects, the filter may be associated with an entity, such as a third party. The third party may have sponsored or otherwise provided for the development of the filter.

In block 715, user input is received indicating that the user has granted distribution rights to the filtered image. For example, as discussed with respect to FIG. 5, in some aspects, the client messaging application 104 may be configured to provide a user interface that enables the user to indicate that they grant distribution rights to the exemplary user generated content 512a and/or 512c.

In block 720, the filtered image is transmitted over a network. In some aspects, the client messaging application 104 may transmit the filtered image to the server messaging application 114 of FIG. 1. In some aspects, a first indication that the distribution rights are granted is also transmitted in block 720. In some aspects, the filtered image and the first indication are transmitted as part of a single network message. In some aspects, an indication of the entity associated with the filter is also transmitted over the network. In some aspects, the filtered image, the first indication, and the second indication are included in a single message.

Figure 8:
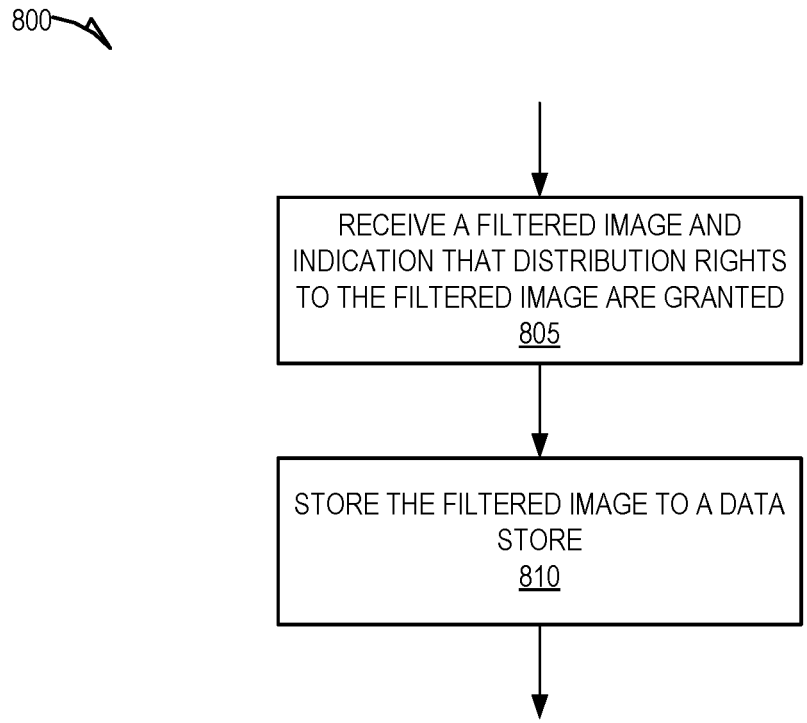

FIG. 8 is a flowchart of a method for storing user generated content. In some aspects, the process 800 discussed below with respect to FIG. 8 may be performed by instructions included in the messaging server application 114, discussed above with respect to FIG. 8.

In block 805, a filtered image is received. In some aspects, the filtered image may be received over a network. With respect to block 805, a filtered image is an image may have had one or more image filters applied to it. In some aspects, the filtered image may be received, over a network, from the client messaging application 104, discussed above with respect to FIGS. 1 and 2. In some aspects the filtered image may be received from a database. In some aspects, the filtered image may be stored in a database table such as the image table 620, discussed above with respect to FIG. 6. In some aspects, one or more indications of filters applied to the filtered image is also received. In some aspects, these indications may be included in an image file storing the image. In some other aspects, these indications may be separate from the image file.

In some aspects, an indication of an entity associated with the image is also received in block 805. For example, as discussed above, in some aspects, a third party entity may sponsor or otherwise be associated with a filter applied to the filtered image.

In some aspects of block 805, a plurality of filtered images are received from a plurality of wireless devices. Each of the filtered images may have had one or more filters applied to it, with each of the filters sponsored or otherwise associated with a particular entity. Each of the filtered images may have identical or different combinations of filters applied to them. In these aspects, for each filtered image received, an indication of filters applied to the respective image is also received in block 805.

In block 810, the filtered image(s) is/are stored to a data store. For example, in some aspects, block 810 may populate one or more of the tables discussed above with respect to FIG. 8 based on the data received in block 805. For example, based on the received image(s), one or more entries may be created in the image table 620. An image identifier 620 and image data entry 622 may be initialized for each image received in block 805. Entries in the applied filter table 610 may also be created in block 810. For example, an identifier of the image 612 and an identifier of a filter applied to the image 614 may be initialized based on data received in block 805. If multiple filters are applied to the same image, multiple entries to the image table 610 may be made, one for each applied filter.

In some aspects, the disclosed methods and systems may display a view to the database 120 shown in FIG. 1 as the story component 404 discussed above with respect to FIG. 4. In some aspects, the story component 404 may be presented on a user interface of the client messaging application 104, but the story component 404 itself may not be a separate physical data store.

Figure 9:
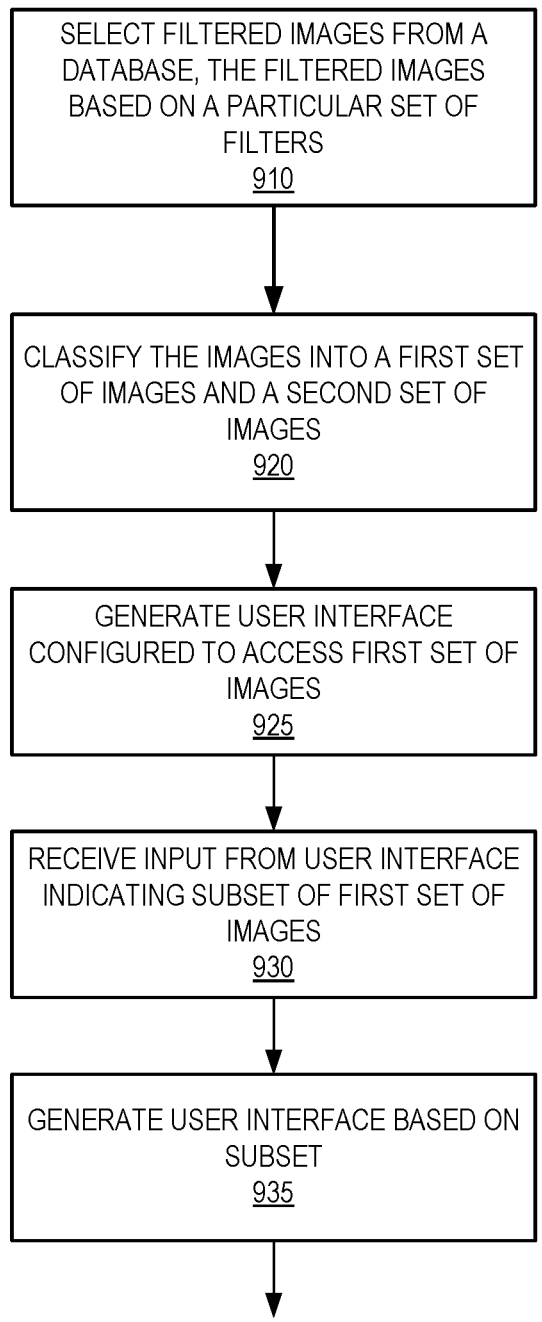

FIG. 9 is a flowchart of a method of filtering user generated content. In some aspects, process 900 discussed below with respect to FIG. 9 may be performed by instructions included in the server messaging application 114, discussed above with respect to at least FIGS. 1 and 2.

In block 910, filtered images are selected from a database. In some aspects, the filtered images are selected from the database 120 discussed above with respect to FIG. 1. The selection may identify images that are based on a particular set of one or more filters. The filters used to identify the selected images may be associated with one or more entities (e.g. a set of entities).

In some aspects, block 910 includes establishing a session with a user. For example, establishing the session may include receiving and verifying authenticating credentials for the user. (e.g. user name & password). One or more of the functions discussed with respect to process 900 may be performed under the security credentials established via the user session. The user may be associated with an entity. For example, during a user registration, input may be received establishing an association between the user and the entity. In some aspects, the selection of the images is based on the user and the association with the entity. For example, the session under which process 900 is performed may define the selection of images in block 910, in that the selected images are relevant to the session's user. In some other aspects, the user that establishes the session in block 910 may not be associated with the entity, but may instead be associated with the social network system 116 instead. For example, the functions discussed with respect to the first user session may be performed by a team member of the social network, to prepare some initial images for review by a member of the entity's team further below.

In block 920, the images are classified into a first set of images and a second set of images. In some aspects, the images may be classified based on the content of the images. For example, in some aspects, the images may be classified based on whether they contain inappropriate content or not. Inappropriate content may include content that may be objectionable to a threshold number of individuals within a population. For example, in some aspects, a not safe for work (NSFW) filter may be applied to classify the images into the first or second set of images. If the NSFW filter indicates the image is not safe for work, it may be included in the second set of images. Otherwise, the image may be included in the first set of images. In some aspects, the NSFW filter may include a convolutional neural network trained on a training set of images. A variety of image classification techniques may be employed in various embodiments to classify the images into the first and second set of images. For example, one or more of pre-pixel classification, sub-pixel classification, per-field classification, contextual classification, knowledge based classification, or a combination of one or more of these classifiers may be employed in the disclosed methods and systems.

In block 925, a user interface is generated over the first session. The user interface is configured to access images in the first set of images. The user interface may be configured such that it is unable to access images in the second set of images. Generating a user interface may include, in some aspects, generating control information that defines a user interface to be presented on a display screen of the client device 102. For example, in some aspects, generating the user interface may include generating html statements for display on the client device 102, with the html statements provided with access to the first set of images. In some aspects, other user interface technologies may result in alternative implementations of block 925. For example, in some implementations, generating a user interface may include signaling to the messaging client application 104 to display a particular user interface that the messaging client application 104 may be preconfigured to display. In these aspects, generating the user interface may include identifying the preconfigured user interface to the messaging client application 104, and passing the messaging client application 104 data indicating how it is to access the images in the first set of images.

In block 930, input is received indicating a selection of a subset of the first set of images. In some aspects, the subset encompasses the entire first set of images. As discussed above, the user may select a subset of the first set of images that are consistent with a positioning of a brand associated with the user.

In block 935, a second user interface is generated based on the subset. In some aspects, the second user interface may display images within only the subset. As shown below, in some aspects, the subset of images may comprise a highlight real, showcasing images that meet one or more criteria evaluated (either in an autonomous fashion and/or in combination with manual review by a user). In some aspects, block 935 may include establishing a second session with a second user by receiving user account credentials for a second user account. The user account credentials may include, for example, a user name and password for the second user account. The second user interface may then be generated over the second session. The second user account credentials may be associated with an account that is designated as associated with an entity. The entity may be associated with one or more image filters, with the subset of images having these one or more image filters applied to them.

Figure 10:
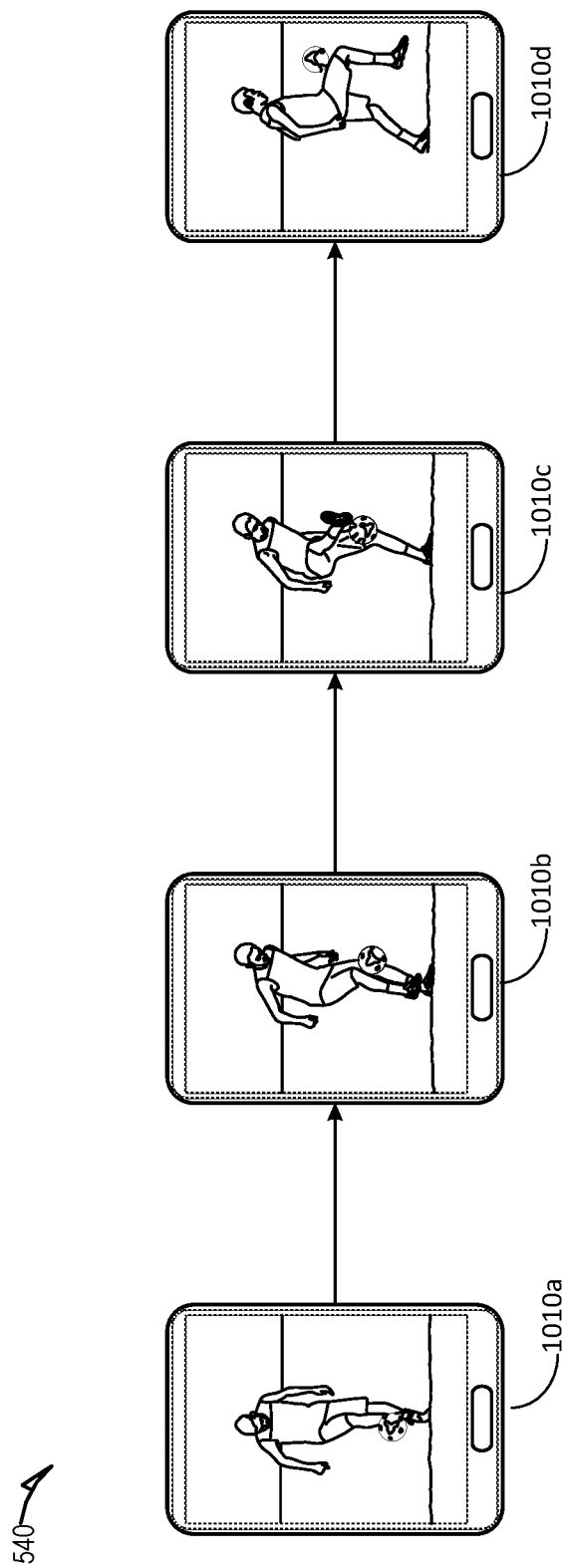
FIG. 10 shows an exemplary embodiment of a content display also described with respect to FIG. 5.

FIG. 10 shows one embodiment of a content display 540. The embodiment of the content display 540 shown in FIG. 10 is a highlight reel. The highlight reel may display images 1010a-d included in the selected content 530 of FIG. 5. In some aspects, images included in the selected content 530 may be organized into an ordinal sequence or reel of images. For example, the ordinal sequence may define that image 1010a is viewed before image 1010b, which is viewed before image 1010c but after image 1010a. In some aspects of the sequence or reel, an image may have a previous image and a subsequent images. An image that begins the reel may have no previous image and an image that ends the reel may have no subsequent image.

In some aspects, controls may be provided to enable a user to page through multiple images within the selected content 530, only one of which is shown at a time in the embodiment of FIG. 10. For example, in some aspects, the content display 540 will be displayed on a touch screen device. In some of these aspects, tapping on a left portion of the screen (such as the left-most 25% of the screen) will transition the display to an image previous to the currently displayed image in a sequence or "reel" of images. In these aspects, tapping on a right portion of the display (such as the right-most 25% of the screen) will transition the display to an image subsequent to the currently displayed image in the sequence or "reel" of images.

In some other aspects, the content display 540 may be displayed on a non-touch display. In these aspects, the content display may be configured to display icons, such as arrows, when a pointing device hovers over a left or right portion of a displayed image. Clicking on the icon may move the highlight reel in a direction indicated by the icon.

In some aspects, the highlight reel shown in FIG. 10 may be configured to automatically advance to a subsequent image after a predetermined time period. For example, in some aspects, the highlight reel may be configured to advance after seven seconds. Upon reaching a final image in the highlight reel, a further advance may display the first image in the sequence/reel in some aspects. In other aspects, the reel may stop displaying additional images upon reaching a final image in the sequence.

In some aspects, the type of content displayed in the highlight reel may be limited. For example, in some aspects, only content passing through a specific process may be displayed by the user interface of FIG. 10. For example, as discussed further below, the user interface shown in FIG. 10 may only display content classified as a particular type of content by a trained classifier may be displayable in the user interface 540. Other restrictions on the type of content may also be provided. For example, as discussed further below, a user creating content displayed in the user interface 540 may be required to explicitly consent to the display of the content in the user interface 540 before it is displayed. The content of the user interface 540 may be displayed to only a particular type of user. For example, some user accounts may include particular access privileges for certain types of content. For example, a user account may specify that images having a particular one or more image filters applied to the content may be accessible to the user account, if other conditions are also met, such as those discussed above. Furthermore, the user interface 540 may, in some aspects, only be reachable from a particular menu of a user having access to the content displayed in the highlight reel.

Thus, the highlight reel user interface may provide an ability to review particular images to which a set of image filters are applied. The image filters may be associated with an entity, such as a particular corporation, which may have, in some aspects, funded development of the associated image filters. The images accessible via the highlight reel interface may be created by social network users, who may consent to their inclusion in the highlight reel. By facilitating a mechanism to channel user generated images that use particular image filters for viewing by a user associated with the entity, the value provided by the particular image filters associated with the entity may be readily visible to the entity, while also protecting user privacy and ensuring the images shared with the entity are appropriate. Security access controls may be implemented to make the highlight reel viewing capability accessible only to those user accounts associated with the entity. In some aspects, only a subset of such users may have access to the highlight reel viewing. For example, access controls may define a separate capability for access to the highlight reel. Thus, the user must be associated with the entity and also have the separate capability indicated before they may access the highlight reel. This separate capability may be reserved for certain management personnel associated with the entity, for example, certain personnel with a marketing group of the entity.

Software Architecture

Figure 11:
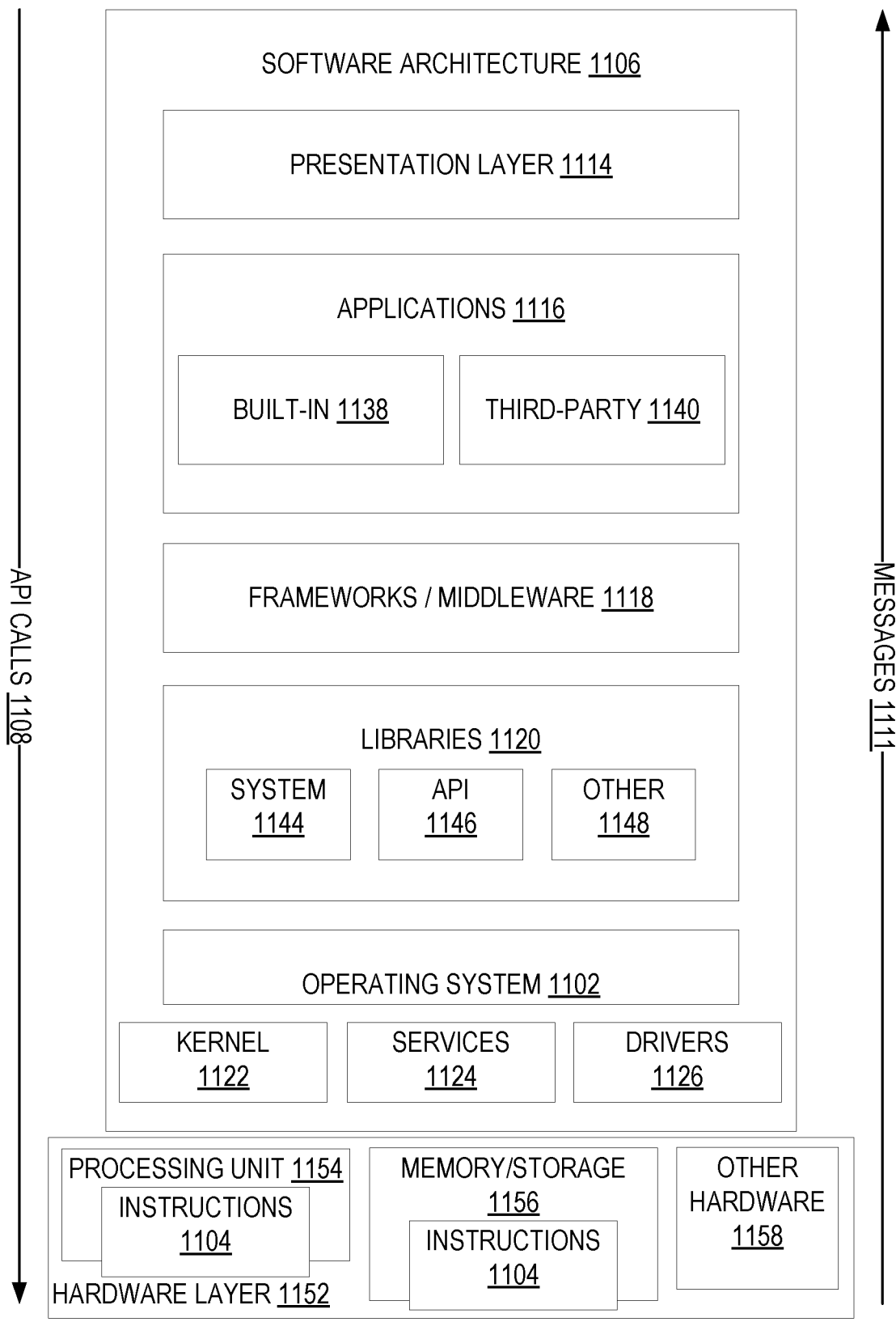
FIG. 11 is a block diagram illustrating a representative software architecture, which may be used in conjunction with various hardware architectures herein described.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as a machine 1100 of FIG. 11 that includes, among other things, processors 1104, memory/storage 1106, and I/O components 1118. A representative hardware layer 1052 is illustrated and can represent, for example, the machine 1100 of FIG. 11. The representative hardware layer 1052 includes a processing unit 1054 having associated executable instructions 1004. The executable instructions 1004 represent the executable instructions of the software architecture 1006, including implementation of the methods, components, and so forth described herein. The hardware layer 1152 also includes memory and/or storage 1156, which also have the executable instructions 1104. The hardware layer 1152 may also comprise other hardware 1158.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive a response as messages 1110. The layers illustrated are representative in nature and not all software architectures have all layers. For example, some mobile or special-purpose operating systems may not provide a frameworks/middleware 1118 layer, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than by interfacing directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. The third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as the operating system 1102) to facilitate functionality described herein.

The applications 1116 may use built-in operating system functions (e.g., kernel 1122, services 1124, and/or drivers 1126), libraries 1120, and frameworks/middleware 1118 to create user interfaces to interact with users of the system. Alternatively, or additionally, in some systems interactions with a user may occur through a presentation layer, such as the presentation layer 1114. In these systems, the application/component "logic" can be separated from the aspects of the application/component that interact with a user.

Exemplary Machine

Figure 12:
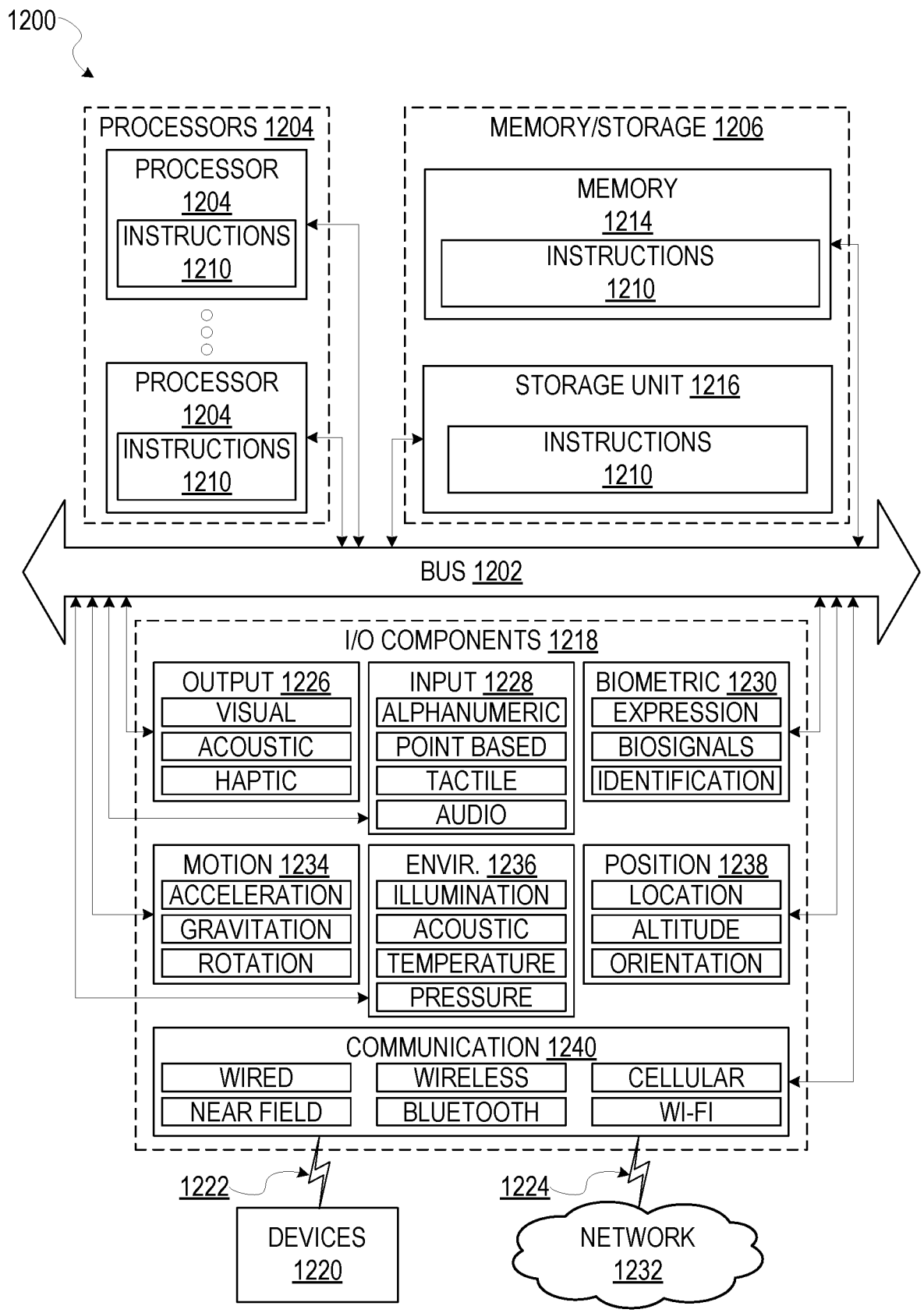
FIG. 12 is a block diagram illustrating components of a machine, according to some exemplary embodiments. The machine is able to read instructions from a machine-readable medium (e.g., a machine-readable storage medium) and perform any one or more of the methodologies discussed herein.

FIG. 12 is a block diagram illustrating components (also referred to herein as "modules") of a machine 1200, according to some exemplary embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of the processors 1204 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1218 may include a wide variety of components to provide a user interface for receiving input, providing output, producing output, transmitting information, exchanging information, capturing measurements, and so on. The specific I/O components 1218 that are included in the user interface of a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various exemplary embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1228 may also include one or more image-capturing devices, such as a digital camera for generating digital images and/or video.

In further exemplary embodiments, the I/O components 1218 may include biometric components 1230, motion components 1234, environment components 1236, or position components 1238, as well as a wide array of other components. For example, the biometric components 1230 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via a coupling 1224 and a coupling 1222 respectively. For example, the communication components 1240 may include a network interface component or other suitable device to interface with the network 1232. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geo-location, location via Wi-Fi® signal triangulation, location via detecting an NFC beacon signal that may indicate a particular location, and so forth.

Figure 13:
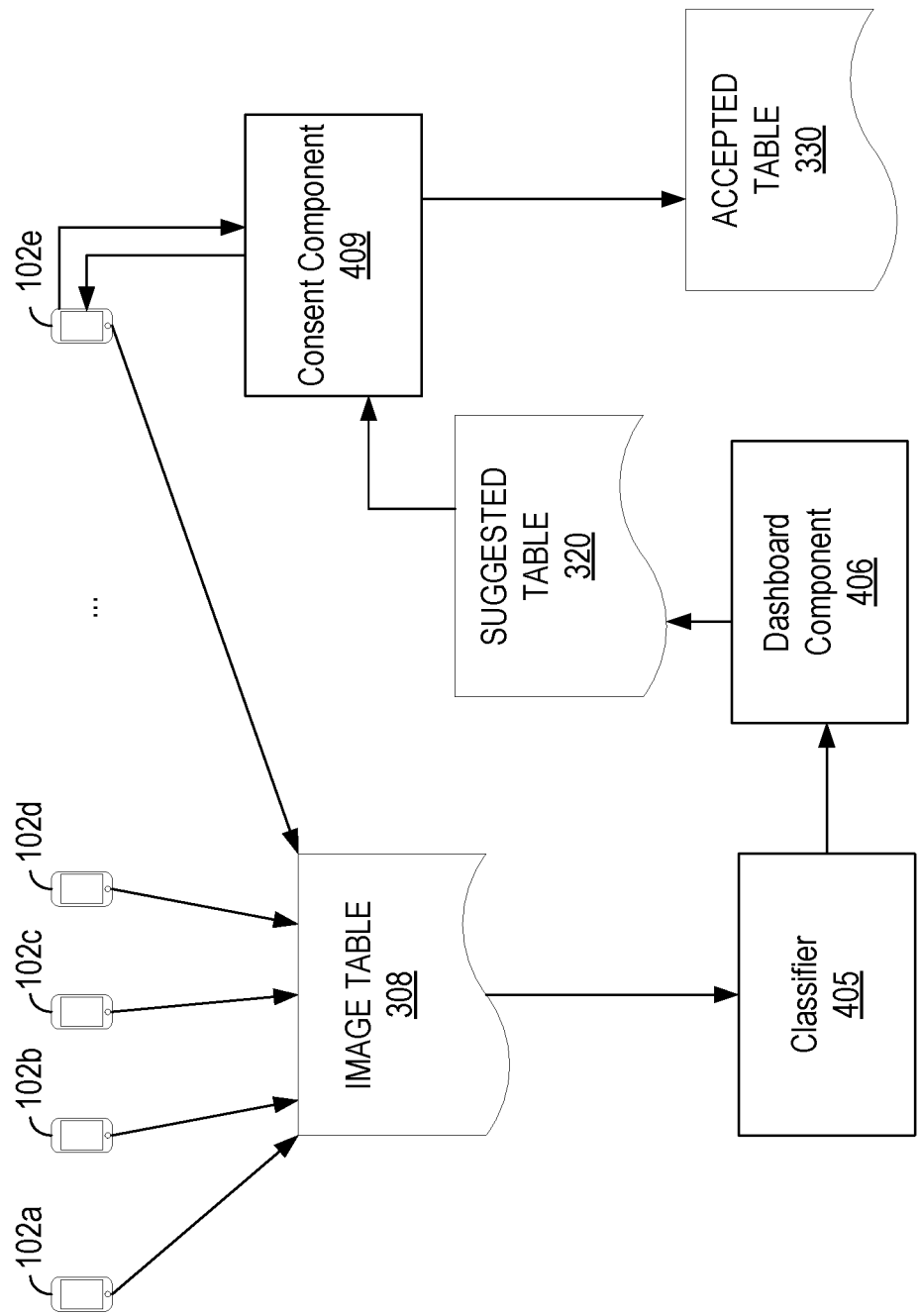
FIG. 13 is a data flow diagram that may be implemented in at least some of the disclosed embodiments.

FIG. 13 is a data flow diagram that may be implemented in at least some of the disclosed embodiments. FIG. 13 illustrates how some embodiments may utilize a trained classifier to identify images that may be appropriate for inclusion in a highlight reel. Once the images are identified, they may be screened by a human or other secondary screening means. After the secondary screening, a user generated a particular image may be solicited for their consent in sharing an identified image. If consent is provided, the images may then be included in a highlight reel.

The dataflow 1300 begins at the client devices 102a-e. Any number of client devices may generate content, and store the content in the image table 308. In some aspects, one or more of the images generated by the client devices 102a-e The classifier 405 may read images from the image table 308 and classify the images into at least two groups. A first group is images that may be appropriate for inclusion in a highlight reel. Another group may be other images not appropriate for inclusion in a highlight reel. In some aspects, the classifier 405 may be further configured to identify images of a third group, those appropriate for inclusion in a highlight reel but unlikely to receive user consent for such inclusion.

Images identified as appropriate the highlight reel may be passed from the classifier 405 to the dashboard component 406. The dashboard component may provide for additional screening of images identified by the classifier. For example, some images identified by the classifier may be judged to be inappropriate for the highlight reel and/or inappropriate to suggest to a user for consent. After any secondary screening is completed by the dashboard component 406, the remaining images are stored in the suggested table 320. Consent for inclusion in the highlight reel is then requested by the consent component 409. If consent is provided by the user, the consent for sharing of the image is recorded in the accepted table 330.

Figure 14:
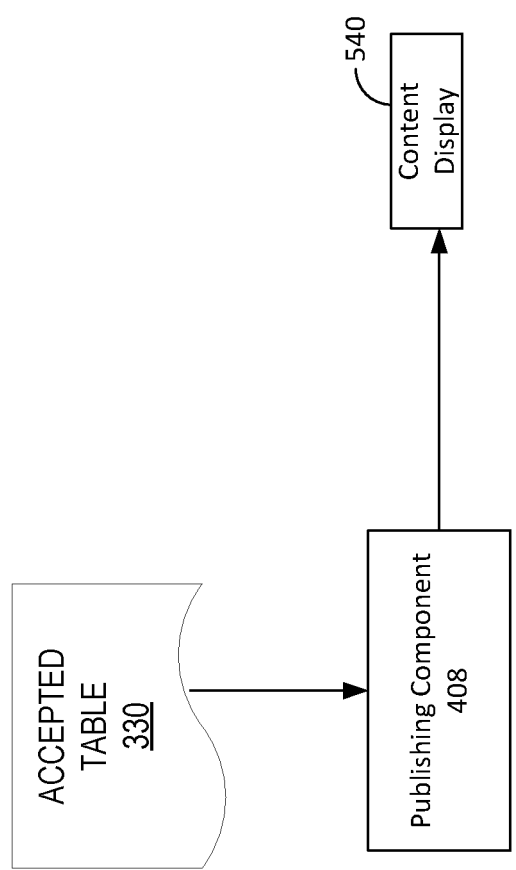
FIG. 14 shows additional data flows that may be implemented in some embodiments.

FIG. 14 shows additional data flows that may be implemented in some embodiments. FIG. 14 shows the accepted table 330, which is described with respect to FIG. 13 above. The images for which user consent has been provided are read by the publishing component 408 from the accepted table 330, and may be displayed via the content display 540.

Figure 15:
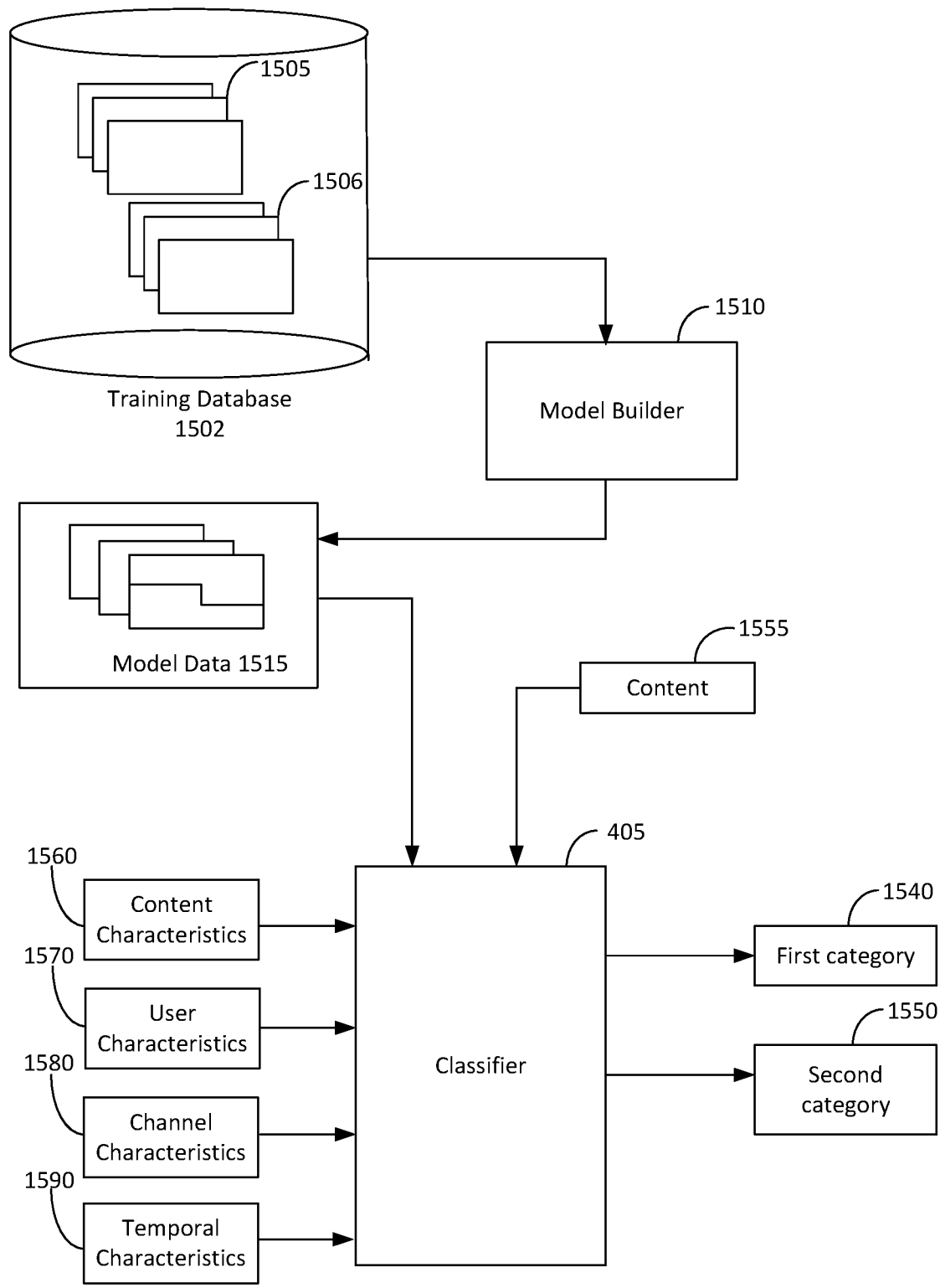
FIG. 15 is a data flow diagram of one exemplary method of training a model to classify user generated content, such as user generated content into one or more categories.

FIG. 15 is a data flow diagram of one exemplary method of training a model to classify user generated content, such as user generated content 512a and/o 512c, into one or more categories. In some aspects, a first category may identify user generated content appropriate for inclusion in a highlight reel. A second category may identify user generated content inappropriate for inclusion in a highlight reel. In some aspects a third category may identify user generated content appropriate for inclusion in a highlight reel, yet unlikely to receive user consent for sharing. FIG. 15 shows a training database 1502. The training database 1502 may include examples of previous user generated content 1505 that was considered appropriate for a highlight reel. The training database 1502 may also include examples of user generated content deemed inappropriate for inclusion in a highlight reel 1506. A model builder 1510 may read the training database 1502 to generate a model database 1520. The model database 1520 may include data describing relationships between user generated content, whether that content was appropriate for inclusion in a highlight reel, and the content's characteristics, user characteristics, temporal characteristics, and channel characteristics of the content.

The classifier 405 may then read the model data 1520 to determine a probability that the content is in the first category, second category, or in some embodiments, the third category. For example, in some aspects, the classifier 405 may determine a probability that the content is in the first category 1540. In some aspects, the classifier 405 may determine a probability that the content is in the second category 1550. In some aspects, the first category 2040 and/or second category 1550 may be determined for each of the user generated content 512a and 512b, discussed above with respect to FIG. 5.

The classifier 405 may base the determination of categories 1530 and/or 1550 based on characteristics of the user generated content 1555. As discussed above, characteristics considered include characteristics of the content itself 1560, characteristics of the user who generated the content 1570, characteristics of a channel 1580 over which the content may be presented, and/or temporal aspects of the content 1590.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

We claim:

1. A method of filtering user generated content, comprising:

receiving, by one or more hardware processors, from a plurality of wireless devices, a plurality of images and data defining one or more attributes for each image;

establishing, by the one or more hardware processors, a first session for a user account;

identifying an image modification effect from a plurality of image modification effects, the identified image modification effect being associated with the user account;

applying a classifier to the plurality of images to identify a given image that includes content that satisfies a criterion for inclusion in a collection of images and for which consent to include the given image in the collection of images is unlikely to be provided from a user of a given one of the plurality of wireless devices from which the given image was received;

selecting, based on the data defining one or more attributes of each image and based on the given image identified by applying the classifier, a collection of images of the plurality of images to which the identified image modification effect was applied;

generating, by the one or more hardware processors, a user interface within the first session, the user interface configured to access the collection of images;

receiving input, by the one or more hardware processors, from the user interface selecting a subset of the collection of images;

identifying a first user associated with a first image in the selected subset of the collection of images;

determining that the first image is associated with ephemeral properties;

notifying the first user to remove the ephemeral properties to publish the first image as part of a story comprising the subset of the collection of images;

establishing, by the one or more hardware processors, a second session for a second user account; and generating, by the one or more hardware processors, a second user interface over the second session, the second user interface configured to display the selected subset of the collection of images.

2. The method of claim 1, further comprising:
adding a second image of the plurality of images to the collection of images responsive to determining that the identified image modification effect was applied to the second image,
wherein the plurality of images are each based on corresponding sets of one or more image filters.

3. The method of claim 2, further comprising:
excluding a third image of the plurality of images from the collection of images responsive to determining that the identified image modification effect was not applied to the third image;
determining an entity associated with the user account of the first session; and
filtering the plurality of images to those images associated with the entity.

4. The method of claim 1, further comprising providing the plurality of images to a convolutional neural network, and filtering out images classified as a particular type of image by the convolutional neural network.

5. The method of claim 1, wherein the second user interface is generated to display a highlight reel comprising the subset of images, the highlight reel displaying the subset of images in an ordinal sequence, the method of claim 1 further comprising:
while a current image of the highlight reel is displayed, receiving input from the second user interface comprising tapping a left portion of a screen on which the current image is displayed; and
transitioning to display a second image that is previous to the current image in the ordinal sequence, in response to the input from the second user.

6. The method of claim 5, further comprising:
generating a uniform resource locator (URL) for the second user interface;
while the current image of the highlight reel is displayed, receiving input from the second user interface comprising tapping a right portion of the screen on which the current image is displayed; and
transitioning to display a third image that is subsequent to the current image in the ordinal sequence, in response to the input from the second user.

7. The method of claim 6, further comprising, receiving, over a network, a request for the uniform resource locator (URL), and providing the uniform resource locator in response to the request.

8. The method of claim 1, further comprising limiting access to at least one of the plurality of images by the one or more hardware processors to a finite period of time based on an ephemeral timer.

9. A system for filtering user generated content, comprising:
one or more hardware processors, configured to perform operations comprising:
receiving, from a plurality of wireless devices, a plurality of images and data defining one or more attributes for each image;
establishing a first session based on authentication credentials for a user account;
identifying an image modification effect from a plurality of image modification effects, the identified image modification effect being associated with the user account;
applying a classifier to the plurality of images to identify a given image that includes content that satisfies a criterion for inclusion in a collection of images and for which consent to include the given image in the collection of images is unlikely to be provided from a user of a given one of the plurality of wireless devices from which the given image was received;
selecting, based on the data defining one or more attributes of each image and based on the given image identified by applying the classifier, a collection of images of the plurality of images to which the identified image modification effect was applied;
generating a user interface within the first session, the user interface configured to access the collection of images;
receiving input from the user interface selecting a subset of the collection of images;
identifying a first user associated with a first image in the selected subset of the collection of images;
determining that the first image is associated with ephemeral properties;
notifying the first user to remove the ephemeral properties to publish the first image as part of a story comprising the subset of the collection of images;
establishing a second session based on second authentication credentials for a second user account; and
generating a second user interface over the second session, the second user interface configured to display the subset of the collection of images.

10. The system of claim 9, wherein the plurality of images are each based on corresponding sets of one or more image filters.

11. The system of claim 10, wherein the operations further comprise:
determining an entity associated with the user account of the first session; and
filtering the plurality of images to include only those images associated with the entity.

12. The system of claim 9, the operations further comprising providing the plurality of images to a convolutional neural network, and filtering out images classified as a particular type of image by the convolutional neural network.

13. The method of claim 1, further comprising training the classifier based on a training set of a plurality of content items, a given one of the plurality of content items including an indication of that the given content item satisfies the criterion for inclusion in the collection of images and that consent for inclusion in the collection of images was not provided by a given user device from which the given content item was received.

14. The system of claim 1, the operations further comprising receiving, over a network, a request for a uniform resource locator (URL), and providing the uniform resource locator in response to the request.

15. The system of claim 9, wherein access to at least one of the plurality of images by the one or more hardware processors is limited in time by an ephemeral timer.

16. A non-transitory computer readable medium comprising instructions that when executed cause a one or more hardware processors to perform operations for content selection, the operations comprising:
receiving from a plurality of wireless devices, a plurality of images and data defining one or more attributes for each image;
establishing, by the one or more hardware processors, a first session with a user;
identifying an image modification effect from a plurality of image modification effects, the identified image modification effect being associated with the user;

applying a classifier to the plurality of images to identify a given image that includes content that satisfies a criterion for inclusion in a collection of images and for which consent to include the given image in the collection of images is unlikely to be provided from a user of a given one of the plurality of wireless devices from which the given image was received;

selecting, based on the data defining one or more attributes of each image and based on the given image identified by applying the classifier, a collection of images of the plurality of images to which the identified image modification effect was applied;

generating a user interface for the user, the user interface configured to access the collection of images;

receiving input from the user interface selecting a subset of the collection of images;

identifying a first user associated with a first image in the selected subset of the collection of images;

determining that the first image is associated with ephemeral properties;

notifying the first user to remove the ephemeral properties to publish the first image as part of a story comprising the subset of the collection of images;

establishing a second session with a second user; and generating a second user interface over the second session, the second user interface configured to display the subset of the collection of images.

17. The non-transitory computer readable medium of claim 16, the operations further comprising providing the plurality of images to a convolutional neural network, and filtering out images classified as a particular type of image by the convolutional neural network.

18. The non-transitory computer readable medium of claim 16, the operations further comprising limiting access to at least one of the plurality of images by the one or more hardware processors to a finite period of time based on an ephemeral timer.

19. The method of claim 1, wherein the identified image modification effect overlays a graphical element on an image to which the identified image modification effect is applied.

* * * * *

UNITED STATES PATENT AND TRADEMARK OFFICE
CERTIFICATE OF CORRECTION

PATENT NO. : 11,216,517 B1
APPLICATION NO. : 16/050969
DATED : January 4, 2022
INVENTOR(S) : Ahmed et al.

Page 1 of 1

It is certified that error appears in the above-identified patent and that said Letters Patent is hereby corrected as shown below:

On the Title Page

On page 2, in Column 1, item (56) under "U.S. Patent Documents", Line 47, delete "9,083,776 B2" and insert --9,083,770 B2-- therefor Signed and Sealed this
Twenty-fourth Day of May, 2022

Katherine Kelly Vidal
*Director of the United States Patent and Trademark Office*